United States Patent
Nayak et al.

(10) Patent No.: US 8,015,249 B2
(45) Date of Patent: Sep. 6, 2011

(54) MITIGATING DATA USAGE IN MESSAGING APPLICATIONS

(75) Inventors: Niranjan S. Nayak, Hyderabad (IN); Neeraj K. Garg, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 11/548,155

(22) Filed: Oct. 10, 2006

(65) Prior Publication Data

US 2008/0084977 A1 Apr. 10, 2008

(51) Int. Cl.
*G06F 15/16* (2006.01)
(52) U.S. Cl. ..... 709/206; 709/204; 709/229; 455/556.2; 725/10; 379/130
(58) Field of Classification Search .................. 715/795
See application file for complete search history.

(56) References Cited

U.S. PATENT DOCUMENTS

| | | | |
|---|---|---|---|
| 6,115,823 A * | 9/2000 | Velasco et al. | 713/322 |
| 6,658,465 B1 * | 12/2003 | Touboul | 709/223 |
| 6,836,885 B1 * | 12/2004 | Buswell et al. | 717/172 |
| 2004/0122896 A1 | 6/2004 | Gourraud | |
| 2004/0153506 A1 | 8/2004 | Ito et al. | |
| 2004/0250212 A1 | 12/2004 | Fish | |
| 2005/0009537 A1 | 1/2005 | Crocker et al. | |
| 2005/0026654 A1 * | 2/2005 | Perez et al. | 455/556.2 |
| 2005/0102389 A1 | 5/2005 | Liscano et al. | |
| 2005/0149932 A1 * | 7/2005 | Hasink et al. | 718/100 |
| 2005/0228895 A1 | 10/2005 | Karunamurthy et al. | |
| 2005/0260989 A1 * | 11/2005 | Pourtier et al. | 455/435.3 |
| 2005/0289394 A1 * | 12/2005 | Arrouye et al. | 714/15 |
| 2006/0095560 A1 | 5/2006 | Wu et al. | |
| 2006/0129673 A1 | 6/2006 | Majumdar et al. | |
| 2006/0143646 A1 * | 6/2006 | Wu et al. | 725/10 |
| 2006/0149740 A1 | 7/2006 | Tsutazawa et al. | |
| 2006/0210034 A1 * | 9/2006 | Beadle et al. | 379/88.22 |
| 2006/0235994 A1 * | 10/2006 | Wu | 709/238 |
| 2006/0265738 A1 * | 11/2006 | Chrysanthakopoulos et al. | 726/3 |
| 2007/0038763 A1 * | 2/2007 | Oestvall | 709/229 |
| 2007/0067455 A1 * | 3/2007 | Gursky et al. | 709/225 |

OTHER PUBLICATIONS

U.S. Appl. No. 60/081,0467, filed Jun. 2006, Forslow.*
Pankaj et al., Patent Application No. 1048/CHE/2003, Dec. 23, 2003.*
WV-031 Command Line Protocol Version 1.1, Open Mobile Alliance Ltd., 2002, http://www.openmobilealliance.org/release_program/docs/IMPS/OMA-WV-CLP-V1_1-20021001-A.pdf, last accessed Oct. 10, 2006, 38 pages.
Pospischil, Gunther, et al. Location-Based Push Architecture for the Mobile Internet. Wireless IP and Building the Internet, 2002, http://lola.ftw.at/homepage/content/a40material/Location_Based_Push_Architectures_for_the_Mobile_Internet.pdf, last accessed Aug. 10, 2006, 22 pages.

* cited by examiner

*Primary Examiner* — Ashok B Patel
*Assistant Examiner* — Andrew Goldberg
(74) *Attorney, Agent, or Firm* — Turocy & Watson, LLP (57) ABSTRACT

Data usage of a messaging application is mitigated based on a location of the application on the display screen or a mode of a device. If the location of the application is in the foreground of the display, presence update information of a contact is periodically received or requested. If the application is in the background of the display longer than a predetermined interval, the presence update information of the contact is stopped. In some embodiments, if the device is in an OFF or a SUSPEND mode, contact presence updates are not received. When the device is in an ON mode or state, the presence updates are received or requested from a server or presence agent.

20 Claims, 10 Drawing Sheets

MITIGATING DATA USAGE IN MESSAGING APPLICATIONS

BACKGROUND

Computing devices are commonly utilized by users to communicate almost instantaneously with one or more contacts. Such information exchange can occur by an user entering information (e.g., text, visual, audio, and so on) into a display area of a user device and communicating with the one or more contacts in a back-and-forth manner without using a telephone or other method of communication. This almost instantaneous communication allows a user and various contacts in disparate locations to communicate in a real time fashion.

Generally, it is expected that the user remains continuously logged onto a real-time messaging application so that the user can receive presence information about the one or more contacts and can communicate with such contacts. The presence information for the one or more contacts is periodically or continuously received at the user device. During periods when the user is not interested in receiving the contact information, the receipt of contact presence information can increase data usage on the network, which can potentially cause congestion on the network. In addition, a user may be charged for the amount of data transmitted to/from the device and, thus, if contact update information is not needed, money and other valuable resources are wasted. Further, receiving data over the network can increase CPU usage for processing the presence information and can reduce battery life.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with providing a user of a computing device the ability to monitor the presence and availability of various contacts (through respective computing devices) only while the user is interested in receiving such information. When the user is no longer interested in receiving the contact information (e.g., presence and availability), the monitoring application is deactivated and the information is no longer sent, thus reducing the amount of data traffic over a network. When the user is again interested in the information, the monitoring application is reactivated and the contact information is communicated to the user automatically.

The user can register with a presence agent and monitor for the presence of one or more contacts. A monitoring system can infer that the user is no longer interested in monitoring the presence and availability of various contacts by monitoring whether a user is actively using the computing device. This information can be inferred when a user sends the monitoring application to the background (e.g., is performing other functions) and the user does not review information of the monitoring application for a set amount of time (e.g., five minutes). In some embodiments, the monitoring application can be sent the background when the application has not been used for a predefined period (e.g., five minutes). It might also be inferred that the user no longer wants to monitor contact information when the user device is placed in a suspended mode.

The monitoring system can infer when the user is again interested in monitoring the various contacts, and automatically reactivate the monitoring application. Such inference can be made when the monitoring application is brought into the foreground or when the user makes the monitoring application the "active window." It can also be inferred when the device is switched from a suspended mode to an "on" mode or active mode. When the monitoring application is reactivated, the user can receive contact presence updates.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

The various embodiments disclosed herein can be performed on electrical devices (referred to herein as user device or simply device) including devices that utilize touch screen display technologies and/or mouse-and-keyboard type interfaces. Examples of such devices include computers (desktop and mobile), smart phones, personal digital assistants (PDAs), data terminals and other electronic devices both wired and wireless.

Figure 1:
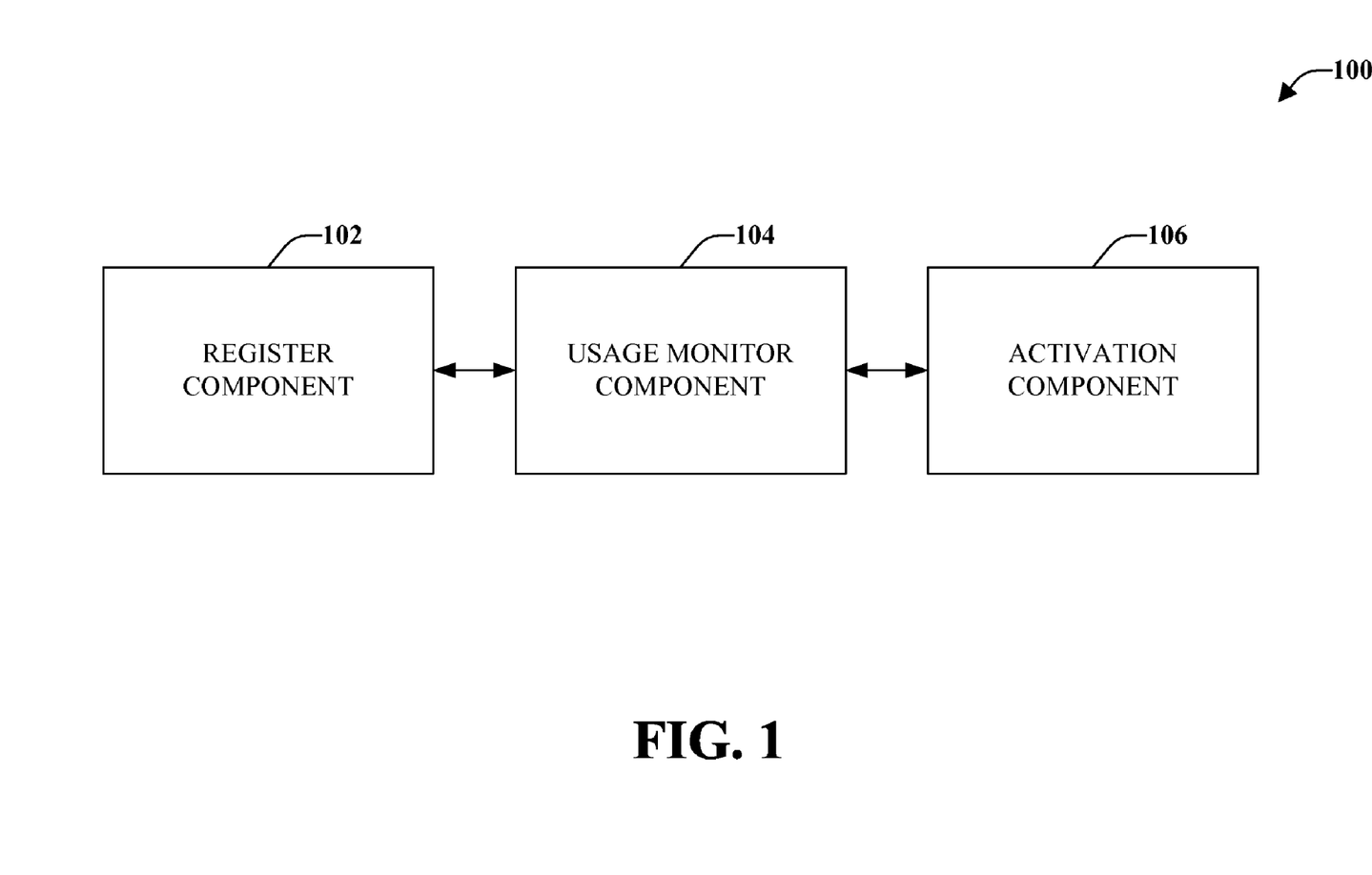
FIG. 1 illustrates a data usage mitigation system.

Referring initially to FIG. 1, illustrated is a system 100 that mitigates the amount of data usage during a messaging application. System 100 can be included in a user device and includes a register component 102 that can be configured to register a device in order to receive (or request) status updates of one or more on-line contacts (e.g., other users, co-workers, friends, business associates, family members) and can notify an usage monitor component 104 of the device registration. Usage monitor component 104 can be configured to monitor usage of registered device and communicate the usage level or device activity to an activation component 106 that can be configured to selectively deactivate (or reactivate) the device registration based in part on the usage or activity level received from usage monitor component 104.

Specifically, register component 102 can allow a user to register a device enabling such user to monitor the status of a contact and receive or request status updates, which provides both the user and the contact a means to communicate (e.g., text, audio, audible, and the like) in a real-time fashion. The status of the contact can include such information as "on-line", "off-line", "busy", "away", "out to lunch", "in a meeting", "on the phone", "will be back in "xx" minutes", and so on. The contact can likewise view the status of the user, thus enabling real-time communication when both participants are available.

However, there may be times when the user is not interested in receiving contact status information. For example, a user may be at work and not utilizing a particular device, or a user may be engaging in activities (e.g., watching a television program, sleeping, eating supper, on a date, and so on) and not interested in communicating with one or more contacts. When the user is finished with the activity, the user may again be interested in communicating with the one or more contacts. Therefore, usage monitor component 104 can monitor the usage level of the device or the activity of the device and, based on such usage level or activity, determine that contact status information is not necessary or is once again desired by the user. Usage activity can be a location of the messaging application within the device display (e.g., background, foreground) or a state or mode of a device (e.g., on, off, suspend). This information can be communicated to activation component 106 that can selectively deactivate and/or re-activate the receipt of contact status update information, enabling communication between the user and the one or more contacts.

In addition to a name or alias of a contact whose presence should be monitored, a user may enter various other information regarding the contact or information (e.g., data) intended for or expected from such contact. For example, a user can rank contacts based on importance or type (e.g., spouse is more important than boss, boss is more important than co-worker, friend is more important than co-worker, and so on). Other information that can be provided can relate to information regarding information intended to be communicated to or received from a particular contact (e.g., key words, key phrases, known information that should be received/sent). Based in part on such information, activation component 106 can selectively determine if presence update information of a particular contact should be stopped or started.

For example, a user has indicated that Contact A and Contact B are of the type "co-worker", Contact C is of the type "boss", and Contact D is of the type "friend" and further indicated that friends are more important in rank than co-workers and co-workers are more important in rank than the boss. When a decision to reduce the number of contacts for which presence update information is received is made in order to mitigate data usage, updates for Contact C (least important) can be stopped first. If a further reduction in contacts is to be made, presence update information for Contacts A and B can be stopped next, since they are less important in ranking than Contact D. The decision to stop/start presence update information can also be made based on other information, or inferred by system 100 based on historical usage or other parameters.

Figure 2:
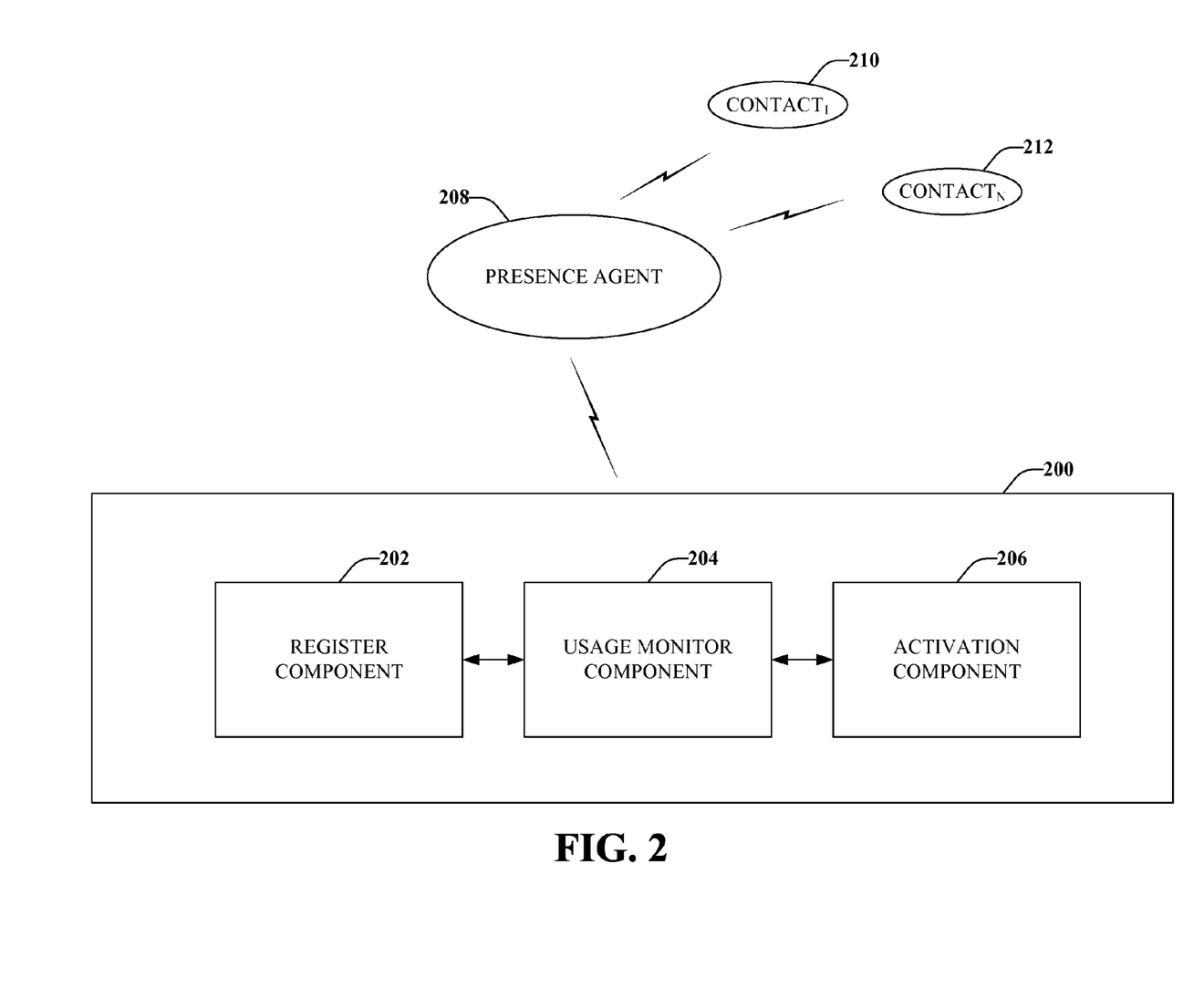
FIG. 2 illustrates another system that selectively activates/deactivates registration with a presence agent.

FIG. 2 illustrates a system 200 that can be configured to selectively activate/deactivate registration with a presence agent. Such activation/deactivation can mitigate network data usage by a mobile device, thus reducing costs associated with operation of the device, especially when real-time messaging applications are utilized. In addition, deactivation can mitigate the amount of CPU usage, which in turn can mitigate degradation of battery life. System 200 includes a register component 202 that facilitates a user registering the device to receive contact information. Also included in system 200 is an usage monitor component 204 that can be configured to monitor a user activity or device usage or activity. Such information is communicated to an activation component 206 that can be configured to selectively activate and/or deactivate the device so that the contact status is received or not received.

In further detail, a user registers device with a presence agent 208, which can be a server that is in wired or wireless communication with device, with register component 202. Such registration can be facilitated through an interface between a server and a client (e.g., mobile device). For example, Session Initiation Protocol (SIP), which is a signaling protocol that provides a mechanism for a user's computing device to locate a contact's computing device on a network with which it wants to communication and to which it wants establish a session can be utilized with the disclosed embodiments. Presence refers to the availability and activity level of a user on a network (e.g., on-line, off-line, busy, and so on). The data relating to the availability and activity level is referred to as "presence information" and can be retrieved by presence agent 208 and returned to the user's computing device where the information may populate a contact or buddy list. Registering with presence agent 208 further includes having the user's presence maintained and to allow various programs on the network to communicate with each other.

The user, wishing to detect the presence of one or more contact (labeled Contact$_1$ 210 and Contact$_N$ 212, where N is an integer greater or equal to one) "subscribes" with the presence agent 208, such as through a SIP SUBSCRIBE message or other interface message between presence agent 208 and device. The presence agent 208 intermediates between the user (sometimes referred to as the watcher) and the one or more contacts 210, 212 to facilitate the communication of the contact's presence information to the user. The ability to detect the presence of the one or more contacts 210, 212 helps in communication and collaboration between the user and the contact. For example, a salesperson might be online at only certain periods during the day. If a colleague (e.g., user) subscribes as a watcher to this salesperson (e.g., contact), the colleague can check the presence of the salesperson and communicate in real-time (e.g., chat) when the salesperson is available rather than sending an e-mail and waiting for a response.

Generally, a user is continuously logged onto a real-time messaging application to allow contacts to check the user's presence and to communicate with the user. The user can subscribe as a watcher to obtain the presence of the contacts. However, at times a user is not actively using the device and does not need to act as a watcher for the presence of contacts. Since many networks require the user to pay for each byte of data traffic that goes over the network, when the user is not interested in presence information, receipt of such information is wasteful in regards to both network resources and associated costs for the user. The receipt of presence information can also increase CPU usage, thus, if the information is not needed, receipt of it can reduce battery life due to the increased CPU usage.

For example, a SUBSCRIBE message with a non-zero timeout value can be sent to the presence agent 208 when the user wants to act as a watcher for one or more contacts. When a user desires to unsubscribe (e.g., no longer receive presence updates regarding one or more contacts), to mitigate wasted resources, a SUBSCRIBE message with a zero timeout value can be sent to the presence agent 208. After receipt of this message, presence agent 208 stops sending the user presence updates for the one or more contacts (e.g., the user has unsubscribed for presence updated for the contacts). The unsubscription process can be repeated individually for each contact. In such a manner, the bandwidth usage is mitigated since presence updates are not sent by the presence agent 208 for those contacts from which user has unsubscribed. Even though a user has unsubscribed from receiving presence of one or more contacts, the presence of the user can continue to be published and his contacts can still initiate a communication, which the user can selectively accept or ignore. Various embodiments for determining when to selectively unsubscribe will be discussed in more detail below.

Figure 3:
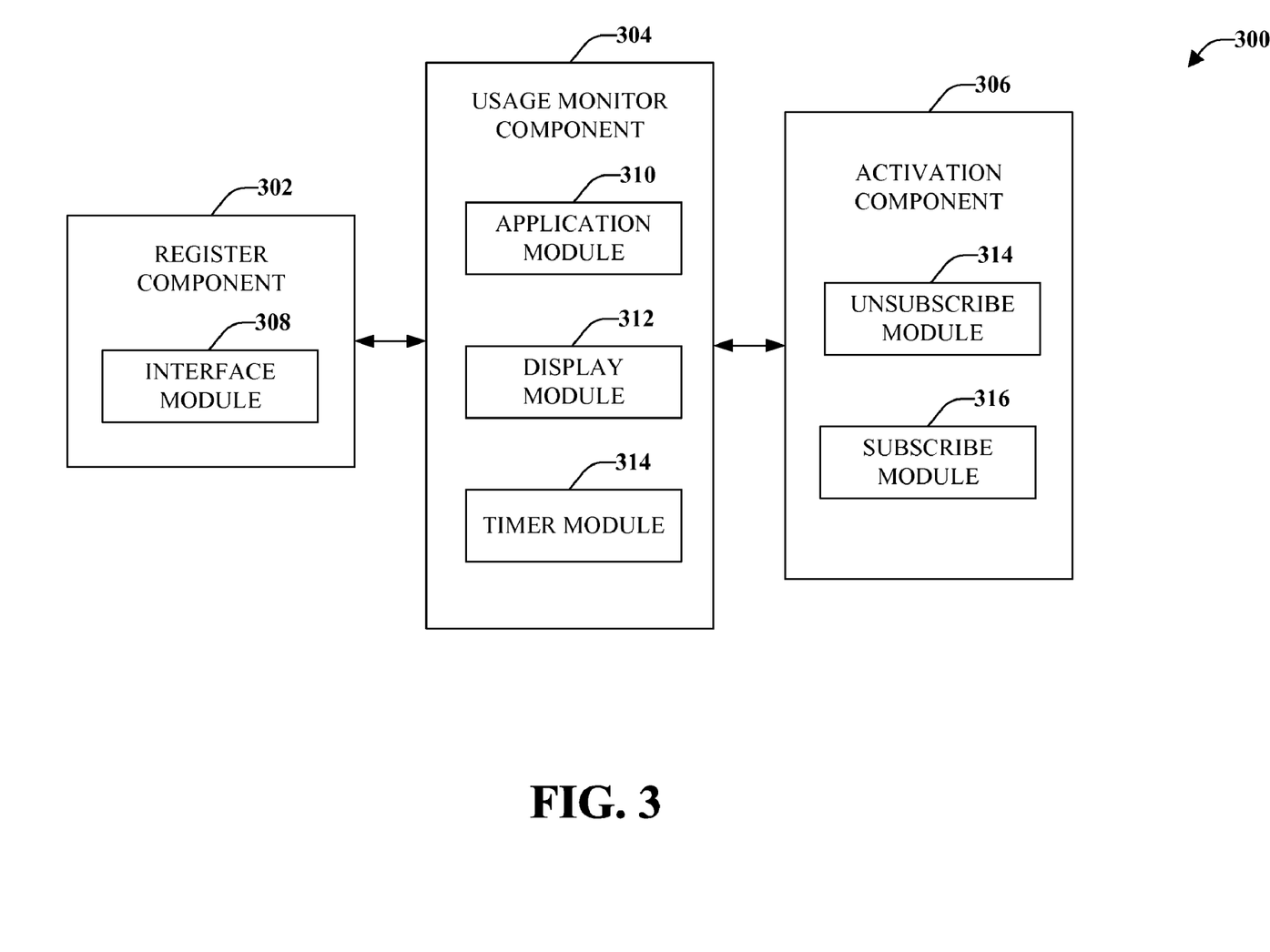
FIG. 3 illustrates a system for selectively subscribing/unsubscribing from a presence agent based on activity of a device display.

FIG. 3 illustrates a system 300 for selectively subscribing to or unsubscribing from a presence agent based on activity of a device display in accordance with some embodiments. System 300 can be implemented on various user devices to allow a user to register (thorough interaction with a register component 302) in order to monitor the presence of various contacts in order to communicate with such contacts and further to unsubscribe from presence updates for one or more contacts. An usage activity module 304 can monitor usage of the device and communicate with an activation module 306 that can selectively activate and/or deactivate the presence information for one or more contacts.

Register component 302, can be associated with an interface module 308 that can provide the user a means to register the device, add contact information (e.g., email alias, contact type, contact importance, message importance, and so on), communicate with the one or more contacts, manually revoke device registration for the one or more contacts, and the like. In addition or alternatively, the device registration can be autonomously deactivated and/or activated by system 300 for one or more contacts. Such autonomous activation/deactivation can be facilitated by usage monitor component 304.

An application module 310 can be configured to send an application (e.g., messaging application) to the background on a display and bring a home screen window or a default window into the foreground (e.g., active window) when a particular application (e.g., messaging application) has not be used or is inactive for a period of time. The user can also send the application into the background by manually bringing another application (e.g., data processing application, spreadsheet application, and so on) into the foreground, such as when a user is actively using the other application. A display module 312 can be configured to send a particular application to the background or foreground (either manually or autonomously).

When a real-time messaging application is sent to the background of a user display for longer than a predetermined interval (e.g., the expiration of a set amount of time), which can be determined by a timer module 314, it may indicate that the user is not currently interested in receiving presence updates for the one or more contacts. The predetermined interval or threshold time can be selectively changed by the user or it can be determined by the system 300. In such situations, usage monitor component 304 can receive or create an "inactive" message, which can be communicated to activation module 306 that can selectively send a deactivate or unsubscribe message (though unsubscribe module 314) to a server to stop sending presence updates. When usage monitor component 304 detects usage of the real-time messaging application (e.g., it is brought into the foreground, a user selects an action) an "active" message is sent to activation module 306, which in turn sends an activate or subscribe message (through subscribe module 316) to the server in order to receive contact presence updates.

As discussed herein, the register components and/or interface modules can provide various types of user interfaces. Such as, for example, a graphical user interface (GUI), a command line interface, a speech interface, Natural Language text interface, and the like. For example, a GUI can be rendered that provides a user with a region or means to load, import, select, read, etc. one or more contact information and whether such contact should be monitored (e.g., presence information sent to user), and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed. For example, the user can interact with the one or more contacts by entering the information into an edit control.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 4:
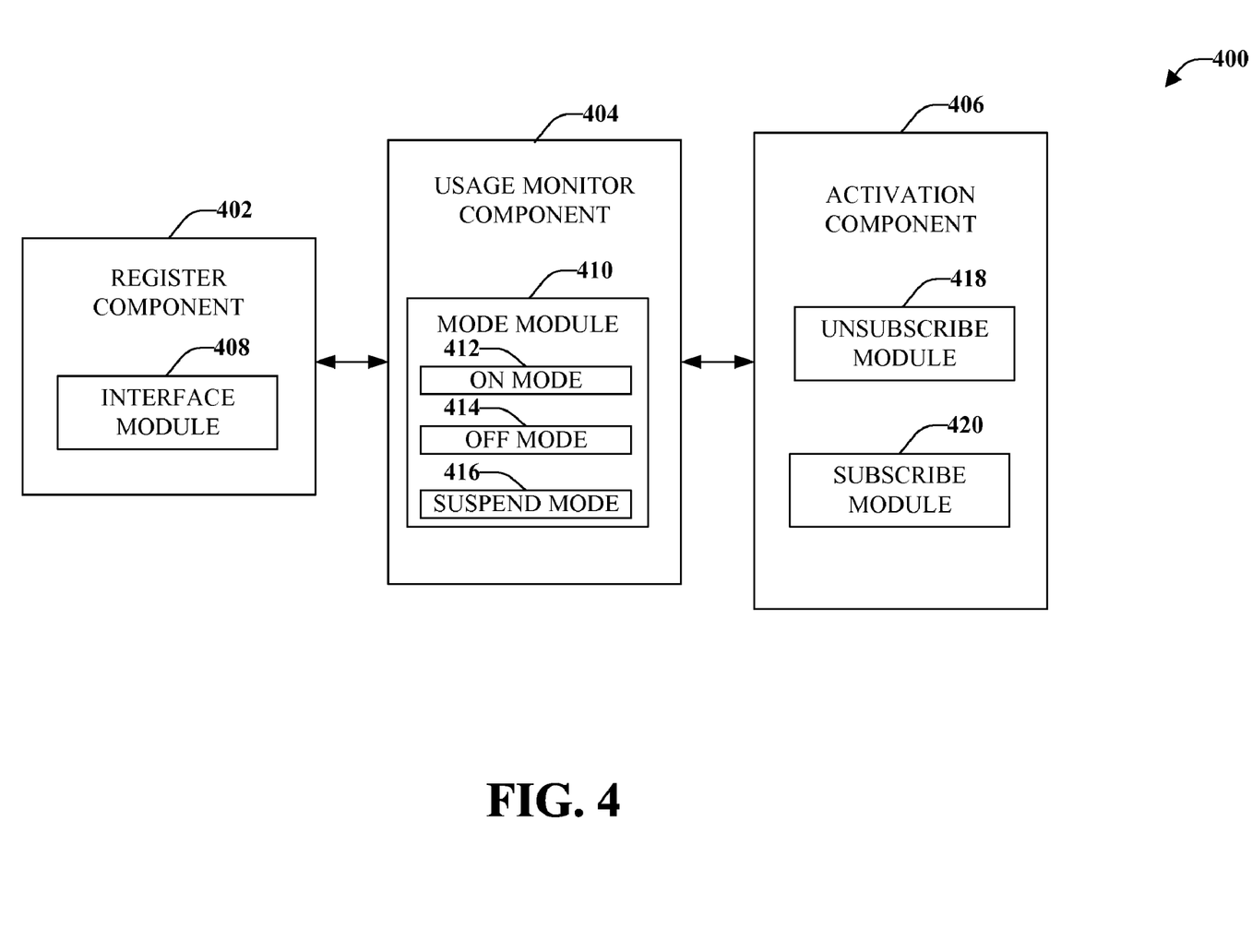
FIG. 4 illustrates a system for selectively subscribing/unsubscribing from a presence agent based on a power mode of a device.

FIG. 4 illustrates a system 400 for selectively subscribing and/or unsubscribing from a presence agent based on a power mode of a device in accordance with some embodiments. System 400 is similar to the systems shown and described in the preceding figures and includes a registration component 402, an usage monitor component 404, and an activation component 406. Registration component 402 can be configured to register a user device (that includes system 400) with a presence agent to detect the presence or absence of one or more contacts to facilitate real-time communication with such contacts. Such registration, communication, and other functions can be input manually by a user through an interaction with interface module 408.

Usage monitor component 404 can be configured to monitor a mode of device. A mode module 410 can place the device into various modes as directed by a user (e.g., manually) or autonomously by system 400 based on an activity level of the user, such as a device state or mode. An ON mode 412 refers to a fully operational device (e.g., the device is working). An OFF mode 414 refers to a device that is not using any power and is not receiving or sending communication (e.g., calls, meeting reminders, and so forth). A SUSPEND mode 416 references to a mode during which the device is conserving power but is not "OFF" or "ON". During SUSPEND mode 416 a display screen of the device is off and the device programs are suspended. Thus, during a SUSPEND mode 416 the system 400 can infer that the user is not interested in receiving presence information regarding one or more contacts. Thus, when mode module 410 senses or infers that the device is going from ON mode 412 into SUSPEND mode 416 (or OFF mode 414) and/or from SUSPEND mode 416 (or OFF mode 414) to ON mode 412, it sends the information to activation component 406.

If activation component 406 receives notice that a SUSPEND mode 416 (or OFF mode 414) is being entered, an unsubscribe module 418 sends an unsubscribe message to a presence agent or server. Thus, the user stops acting as a watcher for the one or more contacts. If activation component 406 receives notice that an ON mode 412 is being entered, a subscribe message is sent to the presence agent by subscribe module 420 to begin or resume presence update information being sent to device. In such a manner, activation component 406 can selectively subscribe and/or unsubscribe the device from receiving presence information from a presence agent, thus mitigating data usage of real-time messaging applications.

Figure 5:
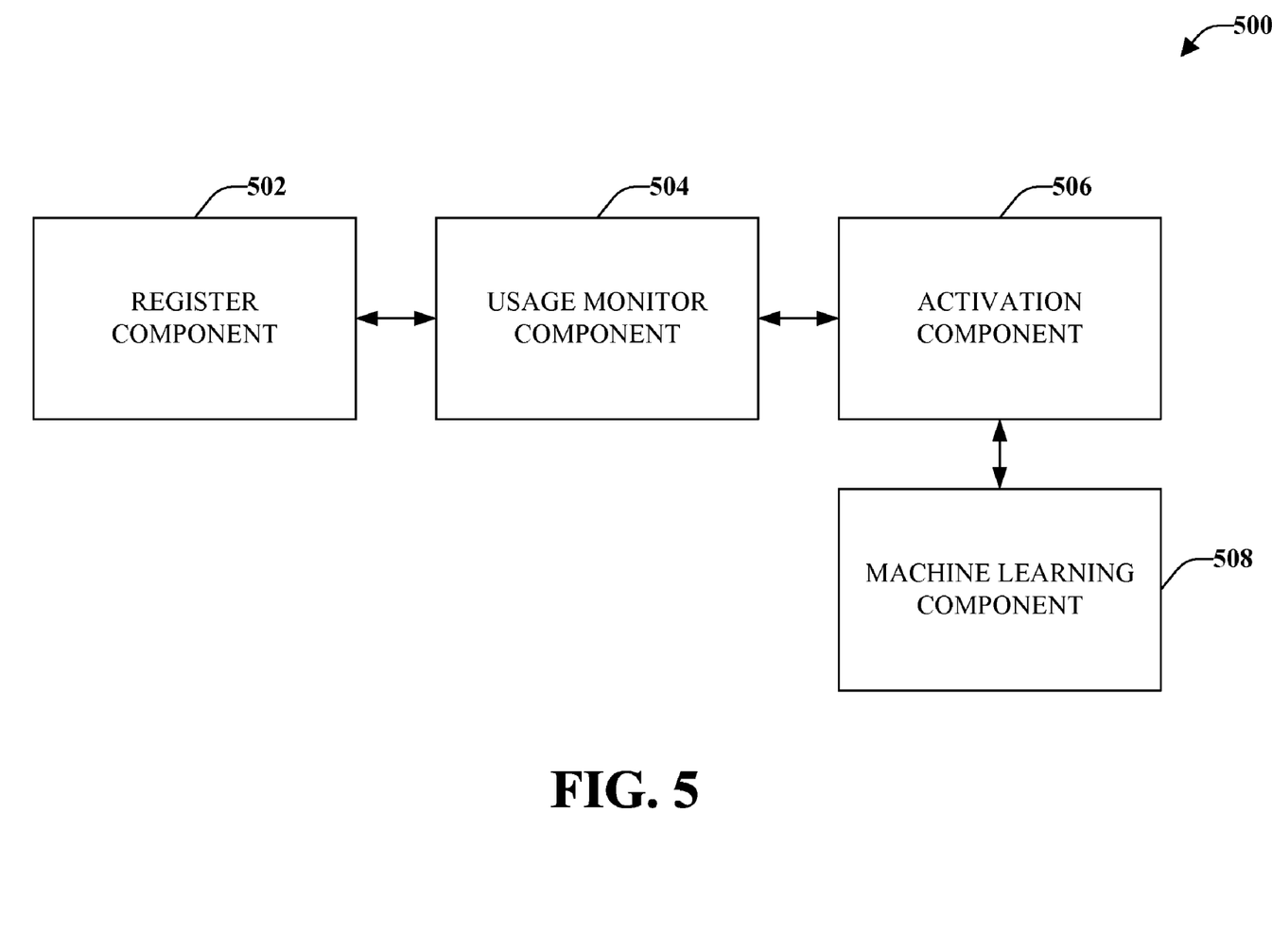
FIG. 5 illustrates a system for mitigating bandwidth usage by selectively deactivating and reactivating a registration with a presence agent utilizing machine learning techniques.

FIG. 5 illustrates a system 500 for mitigating bandwidth usage by selectively deactivating (or reactivating) a registration with a presence agent utilizing machine learning component. Machine learning component 508 can employ artificial intelligence based schemes, rules-based logic schemes, or other schemes. For example, a user has a meeting scheduled and the meeting time is known to system 500. Machine learning component 508 can infer that a user does not want presence update information for a particular contact or for all contacts and stop such updates at substantially the same time as the expected start of the meeting and automatically restart such updates at substantially the same time as the end of the meeting.

Artificial intelligence based systems (e.g., explicitly and/or implicitly trained classifiers) can be employed in connection with performing inference and/or probabilistic determinations and/or statistical-based determinations as in accordance with one or more described embodiments. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

For example, a process for determining if a user is interested in receiving contact presence information can be facilitated through an automatic classifier system and process. Moreover, where multiple contact information is requested (e.g., two or more contact presence information is being monitored or watched by user), the classifier can be employed to determine which contact information to active or deactivate in a particular situation.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of presence information, for example, attributes can be contact alias information, contact type (e.g., boss, coworker, friend, spouse, children, and so on) or other data-specific attributes derived from the known contact information (e.g., urgent information for a contact, waiting for information for a contact), and the classes are categories or areas of interest (e.g., levels of priorities for each contact).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to subscribe or unsubscribe, which contacts to monitor or not monitor, etc. The criteria can include, but is not limited to, the contact, the contact type, the importance of a contact (e.g., spouse is more important than boss), importance of a communication, etc.

In some embodiments, machine learning component 508 employs a rules-based logic scheme. In accordance with this alternate aspect, an implementation scheme (e.g., rule) can be applied to control and/or regulate activation and/or deactivation of presence information for one or more contacts. It will be appreciated that the rules-based implementation can automatically and/or dynamically activate and/or deactivate presence update information based upon a predefined criterion. In response thereto, the rule-based implementation can activate and/or deactivate a subscription to presence information by employing a predefined and/or programmed rule(s) based upon any desired criteria (e.g., contact alias, contact type, data importance, . . . ).

By way of example, a user can establish a rule that can require a contact importance flag (e.g., expecting information from a particular contact) to receive presence information for a particular contact whereas, other contacts may not require such an importance flag (e.g., boss, spouse). It is to be appreciated that any preference can be effected through pre-defined or pre-programmed in the form of a rule. It is to be appreciated that the rules-based logic described can be employed in addition to or in place of the Artificial Intelligence-based logic.

Figure 6:
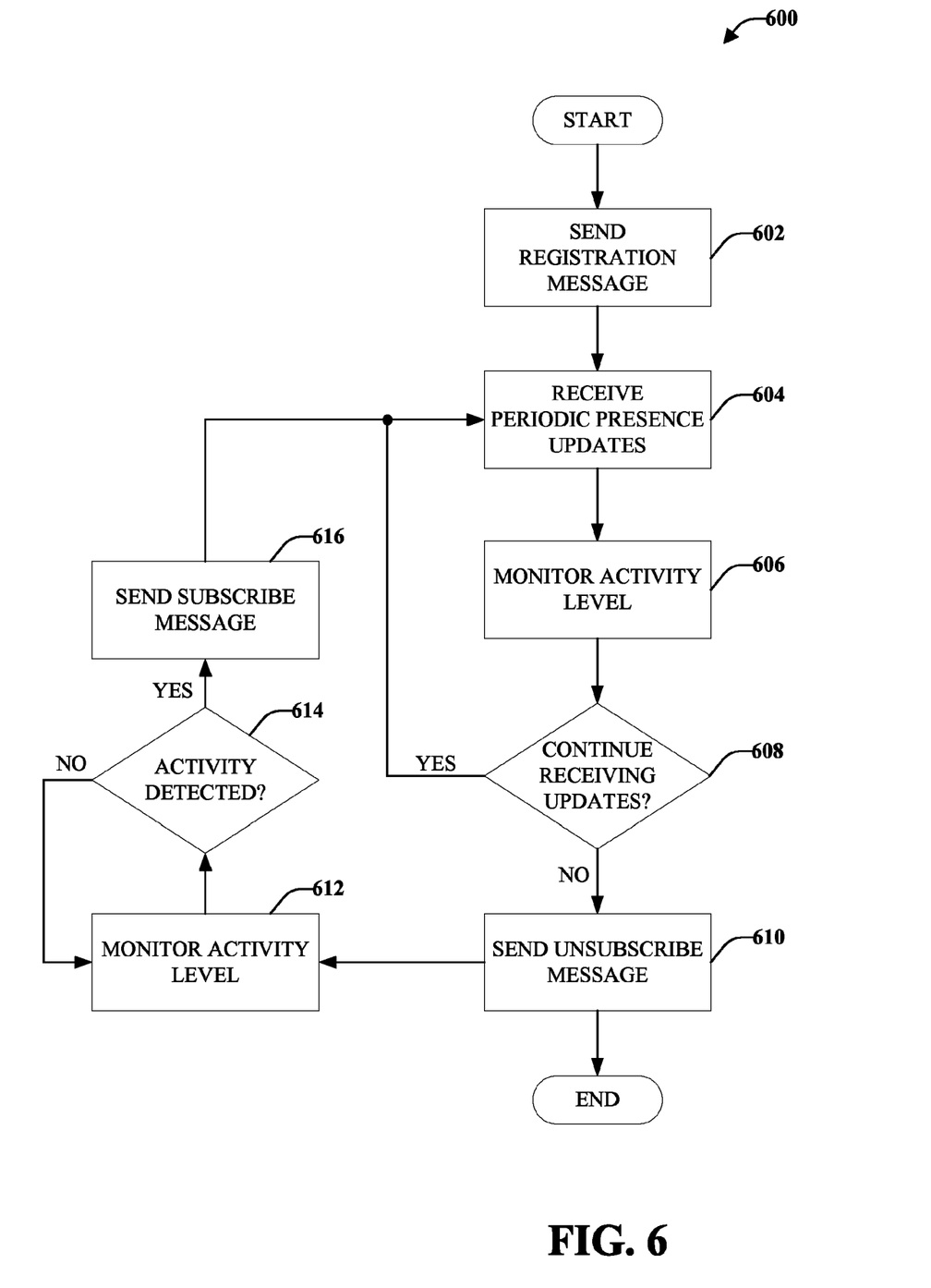
FIG. 6 illustrates a methodology for selectively mitigating data usage in a messaging application.
Figure 7:
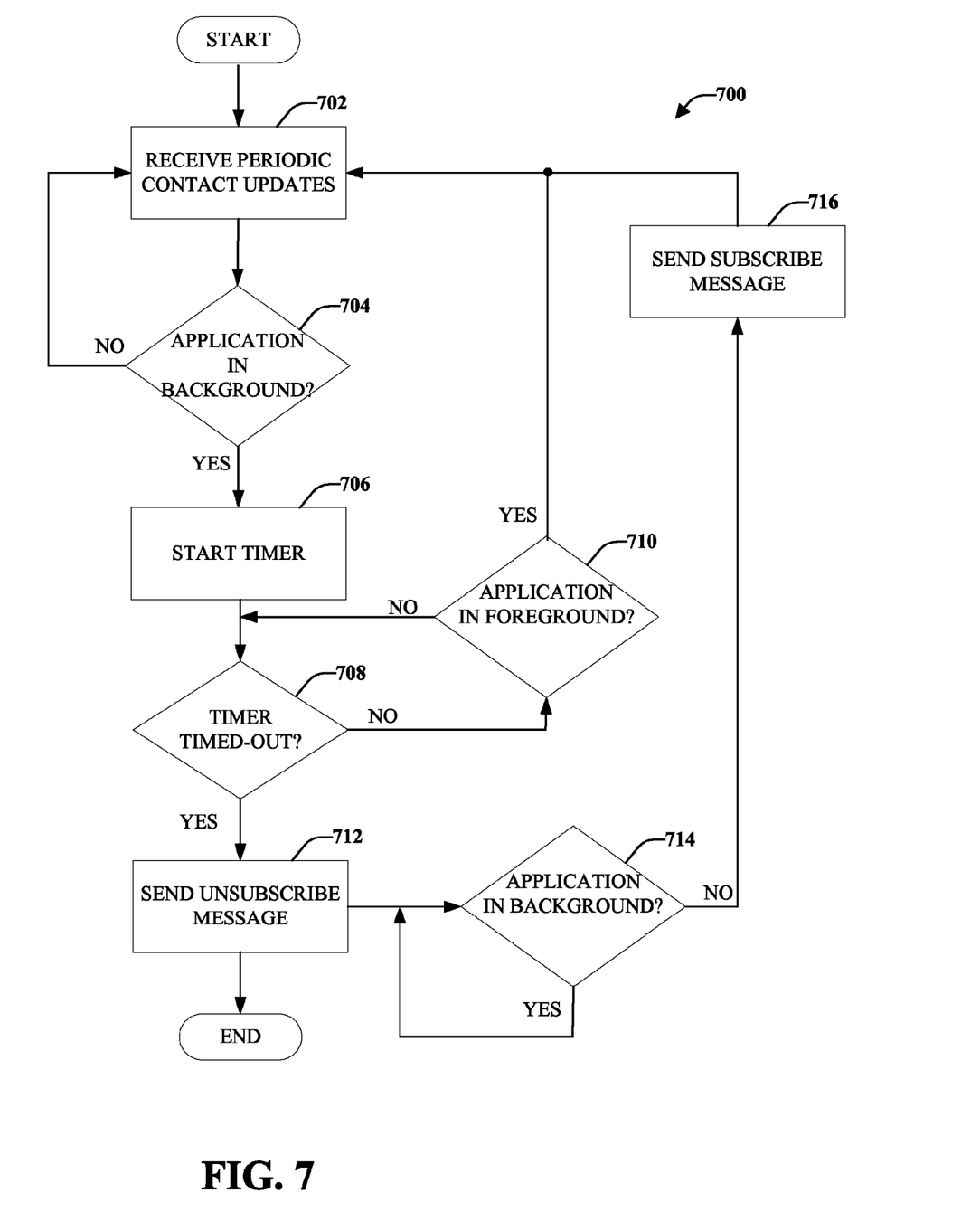
FIG. 7 illustrates a methodology for selectively unsubscribing from and/or subscribing to a presence agent based on a display location of a messaging application.
Figure 8:
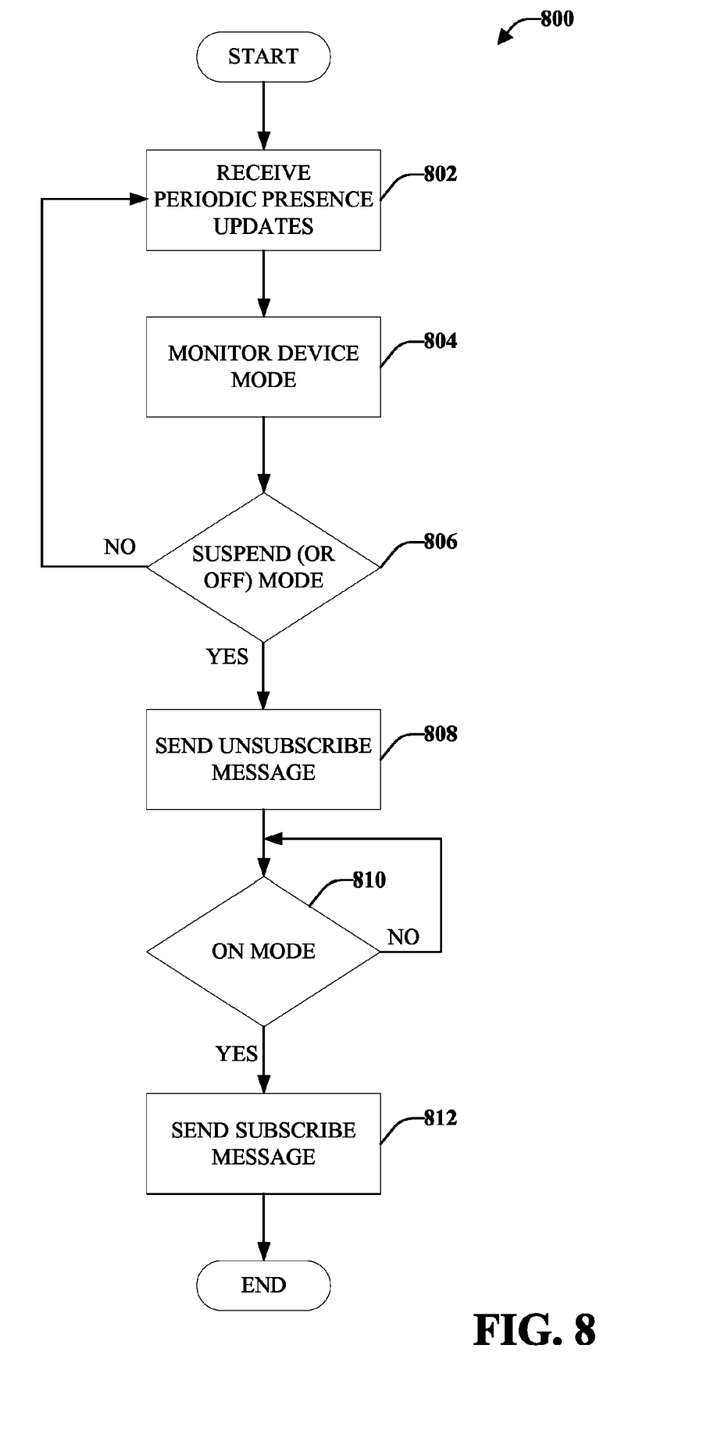
FIG. 8 illustrates a methodology for selectively unsubscribing from and/or subscribing to a presence agent based on a state or mode of a user device.

In view of the exemplary systems shown and described above, methodologies that may be implemented in accordance with the disclosed subject matter, will be better appreciated with reference to the flow charts of FIGS. 6-8. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 6 illustrates a methodology 600 for selectively mitigating data usage in a messaging application. Method 600 beings at 602 when a registration request is sent to a presence agent or server. Such registration request can include one or more contacts and contact information (e.g., contact alias, contact type, contact importance, and so on) as well as information regarding an intended communication from one or more contact (e.g., urgent message to send, expected important message to be received, key word, key phrases, and so forth). Periodic presence updates are received, at 604, that inform a user of the status (e.g., on-line, off-line, busy, and so on) of a contact to facilitate communication between user and contact.

At 606, an activity level of the user is monitored. The activity level can be whether the user is activity using or monitoring the presence information as determined by a location of the messaging application (e.g., foreground or background of a display screen). In some embodiments, the activity level can be a mode or state of the user device. The modes or states can refer to an active device (ON mode), an inactive device (OFF mode), or a device that is currently not being utilized (SUSPEND mode). A device may be in a SUSPEND mode when it is being transported from place to place (e.g., placed in a briefcase, purse, or pocket) and will be utilized when the user arrives at the destination (and wants to save time so does not disable the device or put it in OFF mode).

A determination is made, at 608, whether the periodic presence updates should continue to be received for one or more contacts. If the determination is that the updates should still be received ("YES"), the method continues, at 604, with receipt of periodic presence updates. If the determination, at 608, is to discontinue periodic updates ("NO"), an unsubscribe message is sent to presence agent, at 610. A determination to discontinue the presence updates can be made based on the messaging application being in a background of a display longer than a predetermined interval. In some embodiments, the determination to discontinue the periodic updates is made if the device is in a SUSPEND or an OFF mode. The one or more contacts, authorized to receive presence updates regarding the user, can continue to receive such presence updates after the unsubscribe message has been sent. In addition, the one or more contacts can initiate a communication, which user can accept or deny, after the user has unsubscribed from presence updates.

Method 600 can continue to monitor an activity level of the user, at 612. A determination is made, at 614, whether activity is detected. Is there is no activity detected ("NO"), method 600 continues, at 612, with monitoring of activity. If there is activity detected ("YES"), a subscribe (or resubscribe) message can be sent to the presence agent, at 616, if the activity level rises to a level where periodic presence updates should be received. It is to be understood that this act can be recursive such that the activity level is continuously monitored for appropriate activity levels to unsubscribe and/or subscribe to the presence agent.

Moreover, it is to be appreciated that automated and/or dynamic subscribing/unsubscribing for a subset of contacts can be employed in connection with alternate aspects. For example, presence information for some contacts can be deactivated (unsubscribed) while presence information for other contacts are activated (or remain active) based on predefined criteria or an inference based on one or more parameter relating to the user, the device, or the content of a particular information exchange (e.g., key word(s) or phrases).

FIG. 7 illustrates a methodology 700 for selectively unsubscribing from and/or subscribing to a presence agent based on a display location of a messaging application. Method 700 begins, at 702, with receipt of periodic presence updates for one or more contacts. For example, presence updates may be received for a set of contacts while presence updates for other contacts are not received.

A determination is made, at 704, whether the messaging application is in a background or a foreground of the display screen. If the application is in the foreground ("NO") it means the mapping application is currently active (e.g., being used or monitored) and method 700 continues to receive periodic presence updates, at 702. If the determination, at 704, is that the messaging application is in the background ("YES") it means that the user is not actively using or monitoring the messaging application and a timer is started, at 706. The timer can be set (manually or autonomously) for a predetermined interval (e.g., 3 minutes, 7 minutes).

At 708, a determination is made whether the timer has timed-out (e.g., the predetermined interval has expired). If the timer has not timed-out ("NO"), a determination is made, at 710, whether the application is now in the foreground of the display screen. If the application is still in the background ("NO") the timer continues to run. If the application is in the foreground ("YES"), the timer is stopped and does not need to time-out. An application in the foreground indicates that the user is actively using or monitoring the application (e.g., still wants to receive contact presence information), and periodic updates are received, at 702.

If the determination, at 708, is that the timer has timed-out, an unsubscribe message is sent to the presence agent or server, at 712, and presence updates are not received from at least one contact for which the unsubscribe message was sent. Other contacts can be unsubscribed in similar manner.

The method 700 can continue, at 714, where a determination is made whether the application is still in the background of a display. If it is in the background ("YES"), monitoring of the location of the application continues. If the application is in the foreground ("NO"), a subscribe (or resubscribe) message is sent to the presence agent, at 716, and presence updates are received for the one or more contacts for which a subscribe (resubscribe) message was sent. Thus, unsubscribing during periods of inactivity and resubscribing during periods of activity can mitigate data usage, degradation of battery life and/or wasted resources.

FIG. 8 illustrates a methodology 800 for selectively unsubscribing from and/or subscribing to a presence agent or server based on a state or mode of a user device. Contact presence information and updates can be received (or requested) periodically, at 802. The state or mode of the device is monitored at 804 and a determination is made, at 806, whether the device is in a SUSPEND mode or an OFF mode, indicating that the user is not actively using the device. If the determination is "NO", the device is in an ON state, periodic contact presence updates are continued to be received, at 802. If the determination, at 806, is that the device is in a SUSPEND or OFF mode, an unsubscribe message is sent to the presence agent, at 808, in order to discontinue receiving presence updates for one or more contacts.

The state of the device continues to be monitored and, at 810, a determination is made whether the device is in an ON mode (e.g., in active use). If the determination is "NO", the device monitoring is continued until the device is in an ON mode. If the determination is "YES", a subscribe message is sent to the presence agent, at 812, to resume receipt of periodic presence updates for one or more contacts. Thus, based on a device state or mode, data usage and wasted resources are mitigated for a real-time messaging application.

Figure 9:
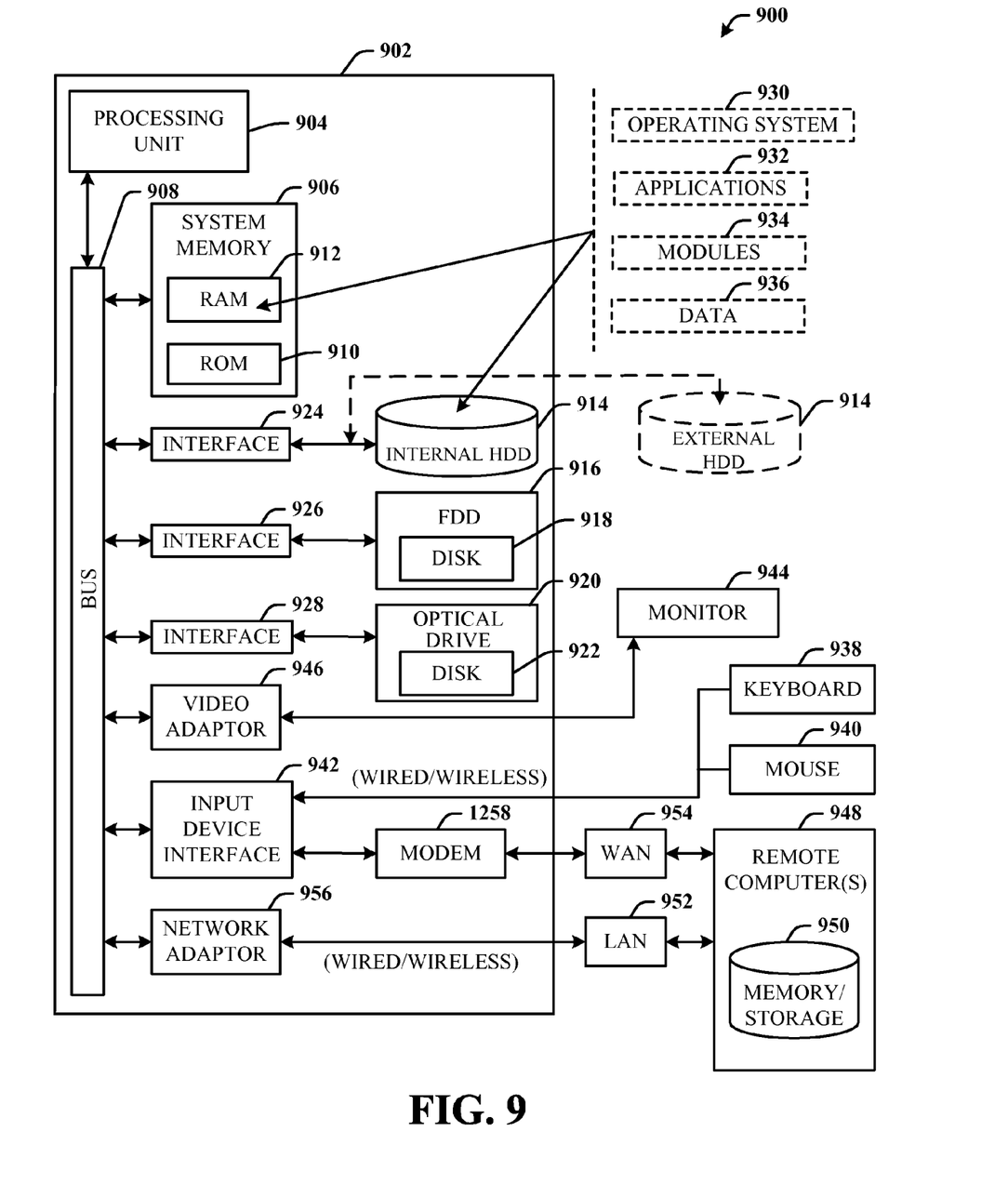
FIG. 9 illustrates a block diagram of a computer operable to execute the disclosed embodiments.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various embodiments can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
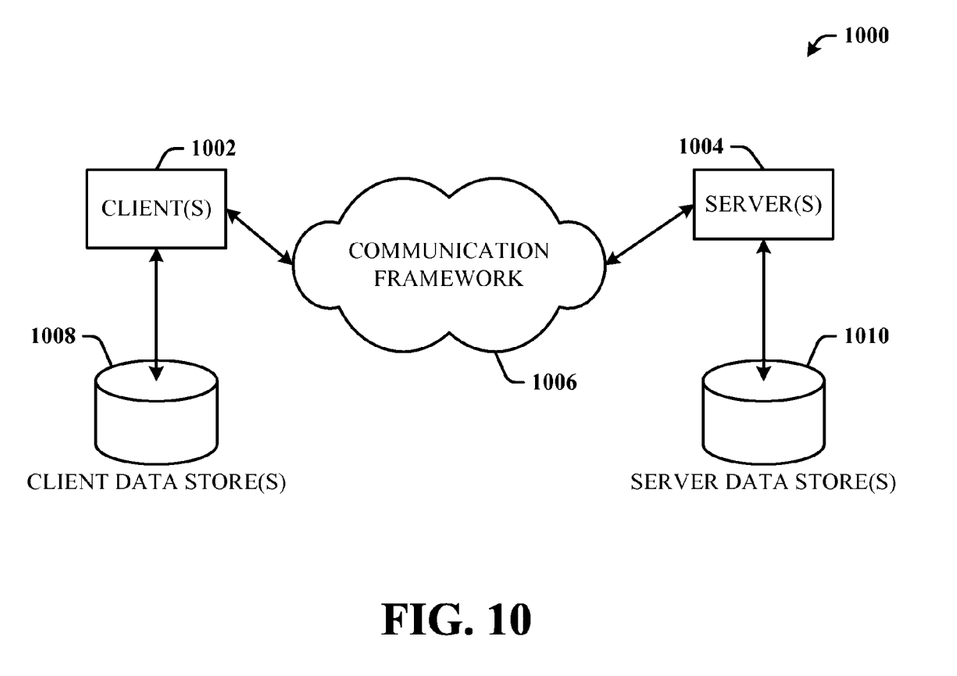
FIG. 10 illustrates a schematic block diagram of an exemplary computing environment operable to execute the disclosed embodiments.

Referring now to FIG. 10, there is illustrated a schematic block diagram of an exemplary computing environment 1000 in accordance with the various embodiments. The system 1000 includes one or more client(s) 1002. The client(s) 1002 can be hardware and/or software (e.g., threads, processes, computing devices). The client(s) 1002 can house cookie(s) and/or associated contextual information by employing the various embodiments, for example.

The system 1000 also includes one or more server(s) 1004. The server(s) 1004 can also be hardware and/or software (e.g., threads, processes, computing devices). The servers 1004 can house threads to perform transformations by employing the various embodiments, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system configured to mitigate data usage in a messaging application, the computer-implemented system comprising:
a processor;
a register component configured to register a device with a presence agent to monitor a plurality of contacts, wherein the presence agent is configured to provide periodic presence updates to the device;
a usage monitor component configured to monitor a usage of the device, detect that a messaging application is sent to a background of a display screen, track an amount of time the messaging application is in the background, and determine that the periodic presence updates are no longer to be received in response to the amount of time exceeding a time defined by a function of time;
an activation component configured to selectively deactivate, from monitoring by the presence agent, a subset of the plurality of contacts independently of an explicit user command and in response to the amount of time the messaging application is in the background exceeding the time defined by the function of time, wherein the subset of the plurality of contacts is deactivated in a sequential order according to a priority; and
a computer-readable storage medium storing instructions that, when executed by the processor, cause the processor to implement at least one of the register component, usage monitor component or the activation component.

2. The computer-implemented system of claim 1, wherein the usage of the device is based on whether the device is in a suspend mode or a background mode.

3. The computer-implemented system of claim 1, wherein the activation component is configured to selectively reactivate the subset of the plurality of contacts based on the usage.

4. The computer-implemented system of claim 1, wherein the usage of the device is based on a location of the messaging application in the display screen of the device.

5. The computer-implemented system of claim 4, wherein the usage of the device varies based on whether the location is in the background of the display screen or a foreground of the display screen.

6. The computer-implemented system of claim 1, wherein the usage of the device is based on whether the device is in an ON mode, an OFF mode or a suspend mode, wherein the suspend mode is a mode wherein the device is in a power saving mode and is not powered off.

7. The computer-implemented system of claim 6, wherein the OFF mode and the SUSPEND mode indicate that at least one contact of the plurality of contacts is no longer to be monitored, and wherein the ON mode indicates that the at least one contact is to be monitored.

8. The computer-implemented system of claim 1, wherein the priority is based on a ranking of the plurality of contacts, wherein the activation component is configured to selectively deactivate the subset based on the ranking, and wherein the ranking is based on data to be sent to the plurality of contacts from the device.

9. The computer-implemented system of claim 1, further comprising a machine learning component configured to automate a deactivation or a reactivation of the activation component.

10. The computer-implemented system of claim 9, wherein the machine learning component is configured to employ at least one of an artificial-intelligence based scheme or a rules-based logic scheme.

11. A method to facilitate selectively mitigating bandwidth usage during messaging activities, comprising:
employing a processor to execute computer executable instructions stored on a computer-readable storage medium to implement acts comprising:
sending a subscribe message that indicates a plurality of contacts to monitor;
receiving periodic updates regarding a presence of the plurality of contacts;
monitoring an activity of a device including detecting a messaging application is sent to a background of a display, tracking an amount of time the messaging application is in the background until a function of time is satisfied, and determining that the periodic updates are not to be received in response to the messaging application being in the background of the display longer than a time defined by the function of time; and
sending a series of unsubscribe messages to a first subset of the plurality of contacts independent of an explicit user command and in response to the messaging application being in the background of the display longer than the time defined by the function of time, wherein the sending includes sending the series of unsubscribe messages in a sequential order according to a priority.

12. The computer-implemented method of claim 11, wherein the monitoring comprises:
wherein the tracking includes tracking the amount of time the messaging application is in the background until a threshold time has expired.

13. The computer-implemented method of claim 11, further comprising:
ascertaining a location of the messaging application; and
sending a re-subscribe message in response to the messaging application being brought to a foreground of the display.

14. The computer-implemented method of claim 11, wherein the monitoring comprises:
determining that the device is in a SUSPEND state, an OFF state or an ON state; and
sending the unsubscribe message in response to the device being determined to be in the SUSPEND state or the OFF state.

15. The computer-implemented method of claim 14, further comprising:
receiving notification that the device is in the ON state; and
sending a re-subscribe message to receive the periodic updates.

16. The computer-implemented method of claim 11, further comprising utilizing priority information to ascertain the priority, wherein the priority information includes at least one of a contact type, a contact importance or a communication importance.

17. The computer-implemented method of claim 16, further comprising selectively sending a re-subscribe message for at least a second subset of the plurality of contacts based on the activity of the device.

18. A computer readable storage medium comprising computer executable instructions that, in response to execution by a computing system, cause the computing system to perform operations, comprising:
sending a subscribe message that indicates a plurality of contacts to monitor;
receiving periodic updates regarding presence of the plurality of contacts;
monitoring an activity of a device including:
in response to a messaging application being sent to a background of a display, tracking an amount of time the messaging application is in the background, and
determining that the periodic updates are not to be received in response to the amount of time being in the background of the display longer than a time defined by a function of time; and
sending a series of unsubscribe messages to a first subset of the plurality of
contacts independent of an explicit user command and in response to the amount of time the messaging application being in the background of the display longer than the time defined by the function of time, wherein the sending includes sending the series of unsubscribe messages in a sequential order according to a priority.

19. The computer readable storage medium of claim 18, wherein the monitoring comprises:
wherein the tracking includes tracking the amount of time the messaging application is in the background until a threshold time has expired.

20. The computer readable storage medium of claim 18, the operations further comprising:
ascertaining a location of the messaging application; and
sending a re-subscribe message in response to the messaging application being brought to a foreground of the display.

* * * * *